United States Patent
In et al.

(10) Patent No.: US 7,737,373 B2
(45) Date of Patent: Jun. 15, 2010

(54) MOBILE TERMINAL KEY INPUT DEVICE AND METHOD

(75) Inventors: Hee Sik In, Seoul (KR); Huhn Kim, Seoul (KR); Sang Yeon Lim, Gyeonggi-do (KR); Hyun Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 739 days.

(21) Appl. No.: 11/670,403

(22) Filed: Feb. 1, 2007

(65) Prior Publication Data

US 2007/0184877 A1      Aug. 9, 2007

(30) Foreign Application Priority Data

Feb. 6, 2006      (KR) ...................... 10-2006-0011300

(51) Int. Cl.
*H01H 9/00*      (2006.01)

(52) U.S. Cl. ........................ 200/1 B; 200/5 A; 200/517; 200/516

(58) Field of Classification Search ................. 200/1 B, 200/406, 516; 345/157, 160, 168, 169; 341/22, 341/27, 34
See application file for complete search history.

(56) References Cited

U.S. PATENT DOCUMENTS

| | | | | |
|---|---|---|---|---|
| 3,707,609 A | | 12/1972 | Dapot et al. | |
| 3,941,964 A | * | 3/1976 | Yoder | 200/516 |
| 4,376,238 A | * | 3/1983 | Martin | 200/513 |
| 4,385,218 A | | 5/1983 | Nishida | |
| 5,952,629 A | * | 9/1999 | Yoshinaga et al. | 200/5 A |
| 6,603,086 B2 | * | 8/2003 | Kawaguchi et al. | 200/517 |
| 6,639,159 B2 | * | 10/2003 | Anzai | 200/1 B |
| 6,784,382 B2 | * | 8/2004 | Yanai et al. | 200/1 B |
| 6,936,777 B1 | * | 8/2005 | Kawakubo | 200/1 B |
| 6,951,991 B2 | * | 10/2005 | Asada et al. | 200/406 |
| 7,217,893 B1 | * | 5/2007 | Huang et al. | 200/1 B |
| 2002/0130024 A1 | | 9/2002 | Kawaguchi et al. | |

FOREIGN PATENT DOCUMENTS

| | | |
|---|---|---|
| CN | 12811233 | 1/2001 |
| DE | 4304304 | 9/1993 |
| EP | 1071106 | 1/2001 |
| WO | 2005/124805 | 12/2005 |

* cited by examiner

*Primary Examiner*—Michael A Friedhofer
(74) *Attorney, Agent, or Firm*—Lee, Hong, Degerman, Kang & Waimey

(57) ABSTRACT

A mobile terminal keypad is provided having a plurality of key switches on the keypad that provides a first signal or a second signal according to the pressure applied to the key switch. In each of the plurality of key switches, a plate is provided to sequentially contact with a first contact and a second contact according to the applied pressure.

21 Claims, 14 Drawing Sheets

VIEW Y-Y'

VIEW Y-Y'

VIEW X-X'

VIEW X-X'

MOBILE TERMINAL KEY INPUT DEVICE AND METHOD

CROSS REFERENCE TO RELATED APPLICATION

This nonprovisional application claims priority under 35 U.S.C. §119(a) on Patent Application No. 10-2006-0011300 filed in Republic of Korea on Feb. 6, 2006, the entire contents of which are hereby incorporated by reference.

BACKGROUND

1. Field of the Invention

The present invention relates to a mobile terminal key input device and a key input processing method.

2. Description of the Related Art

In general, a key input device for providing characters and numbers or for generating electric signals through operations is used for various mobile terminals and devices such as MP3 players, personal digital assistants (PDA), and cellular phones.

The key input device comprises a dome sheet, commonly formed of metal, attached to a printed circuit board (PCB). When the dome sheet is deformed by pressing the exposed key button, the dome sheet is electrically connected to the conductor of the PCB thereby transmitting the electric signal to a controller. As a result, a user may select various functions relating to the terminal.

A mobile terminal usually has a plurality of functions, however key input devices generate a single signal for each press of the button.

Therefore, in order to execute the various functions or contents of the terminal using the key input device, the user must operate a plurality of buttons and may erroneously press the incorrect buttons causing erroneous operations.

SUMMARY

Accordingly, the present invention has been made to solve the above-mentioned problems occurring in the related art.

According to one aspect of the present invention, there is a mobile terminal comprising a key input device comprising a plurality of key switches, each key switch comprises at least two contact points, a plate formed over the contact points, and a key button formed over the plate, wherein pressing the key button urges the plate to sequentially contact each of the at least two contact points, wherein the plate sequentially contacts each of the at least two contact points according to the pressure applied to the key button; and a controller providing control signals in accordance with the sequential contacts of the plate with the at least two contact points.

According to another aspect of the present invention, there is provided a key input device comprising a plurality of key switches comprising at least two contact points, a plate formed over the at least two contact points, and a key button formed over the plate for urging the plate into sequential contact with the at least two contact points according to pressure applied to the key button.

According to another aspect of the present invention, there is provided a method for processing a key input device of a mobile terminal comprising receiving a key switch signal from the key input device that sequentially generates at least two key signals in accordance with the pressure applied to the key input device, determining whether the key switch signal is a first key signal or a second key signal in accordance with the pressure applied, and processing a function according to whether the key switch signal is the first or the second key signal.

BRIEF DESCRIPTION OF THE DRAWINGS

The present invention will be described in detail with reference to the following drawings in which like numerals refer to like elements.

DETAILED DESCRIPTION OF EMBODIMENTS

Embodiments of the present invention will be described in a more detailed manner with reference to the drawings. A mobile telephone is used as an example of a mobile terminal.

Figure 1:
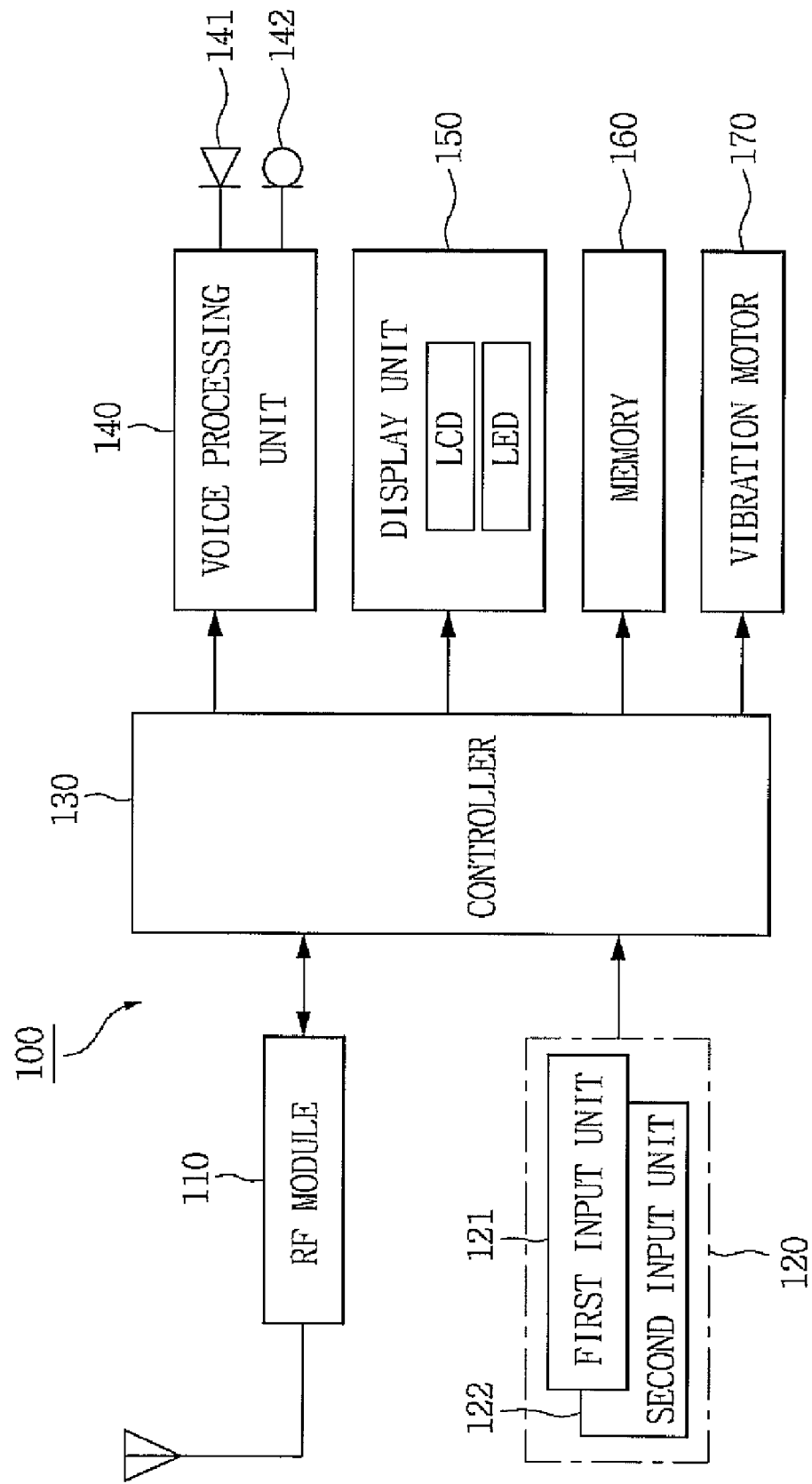
FIG. 1 is a block diagram of a mobile terminal according to one embodiment of the present invention.

FIG. 1 is a block diagram of a mobile terminal according to one embodiment of the present invention, in particular, a mobile telephone.

Referring to FIG. 1, a mobile telephone 100 comprises an RF module 110, a keypad 120, a controller 130, a voice processor or vocoder 140, a display 150, a memory 160, and a vibration motor 170.

The RF module 110 transmits an electric signal to and receives the electric signal from the controller 130, and may receive external data by communicating with an external apparatus.

The key input device 120, the keypad, for example, comprises a plurality of key switches. Each of the key switches has a primary and a secondary input in accordance with the pressure applied by a user. Therefore, each of the key switches for the keypad 120 comprises a first input unit 121 for providing a first output signal and a second input unit 122 for providing a second output signal.

The controller 130 receives an input signal from the keypad 120 and provides a control signal to the RF module 110, the voice processor 140, the display 150, the memory 160 and the vibration motor 170, etc.

The voice processor 140 provides a voice signal to a speaker 141 or receives a voice signal from a microphone 142. The voice processor 140 performs voice signal processing in accordance with the control signal of the controller 130.

An image signal on which signal processing is performed by the controller 130 is provided to the display 150. The display 150 may be a liquid crystal display (LCD) panel comprising a plurality of light emitting diodes (LED).

Various files and programs for operating functions of the mobile telephone 100 and downloaded data items are stored in the memory 160.

The vibration motor 170 generates vibration in accordance with the control signal of the controller 130. For example, a vibration motor 170 generates vibration in accordance with the feedback signal of the controller as described below.

Figure 2:
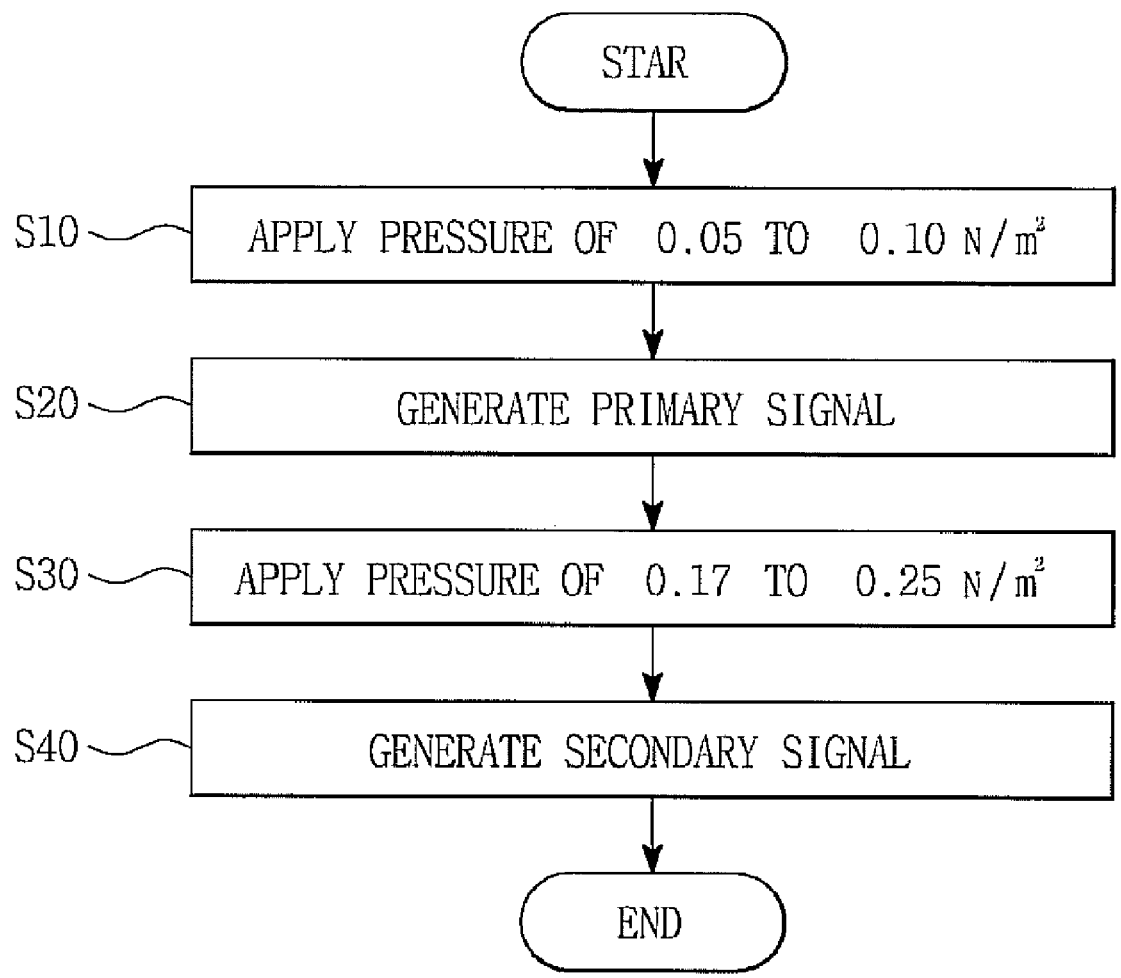
FIG. 2 is a flowchart for providing a signal from a keypad of the mobile terminal of FIG. 1.

FIG. 2 is a flowchart of outputting a signal by a keypad according to an embodiment of the present invention.

Referring to FIG. 2, when a user presses the key button of the keypad 120 for a mobile telephone 100 by predetermined pressure, for example, 0.05 to 0.10 N/m$^2$, at S10, a first contact point is internally formed to generate a first signal at S20 to the first input unit 121. When the total pressure that is higher than the above-described pressure, for example, the pressure of 0.17 to 0.25 N/m$^2$, is applied at S30, a second contact point is internally formed to the second input unit 122 to generate a second signal at S40.

As a result, the keypad 120 generates two signals according to the pressure applied to a key button.

Figure 3:
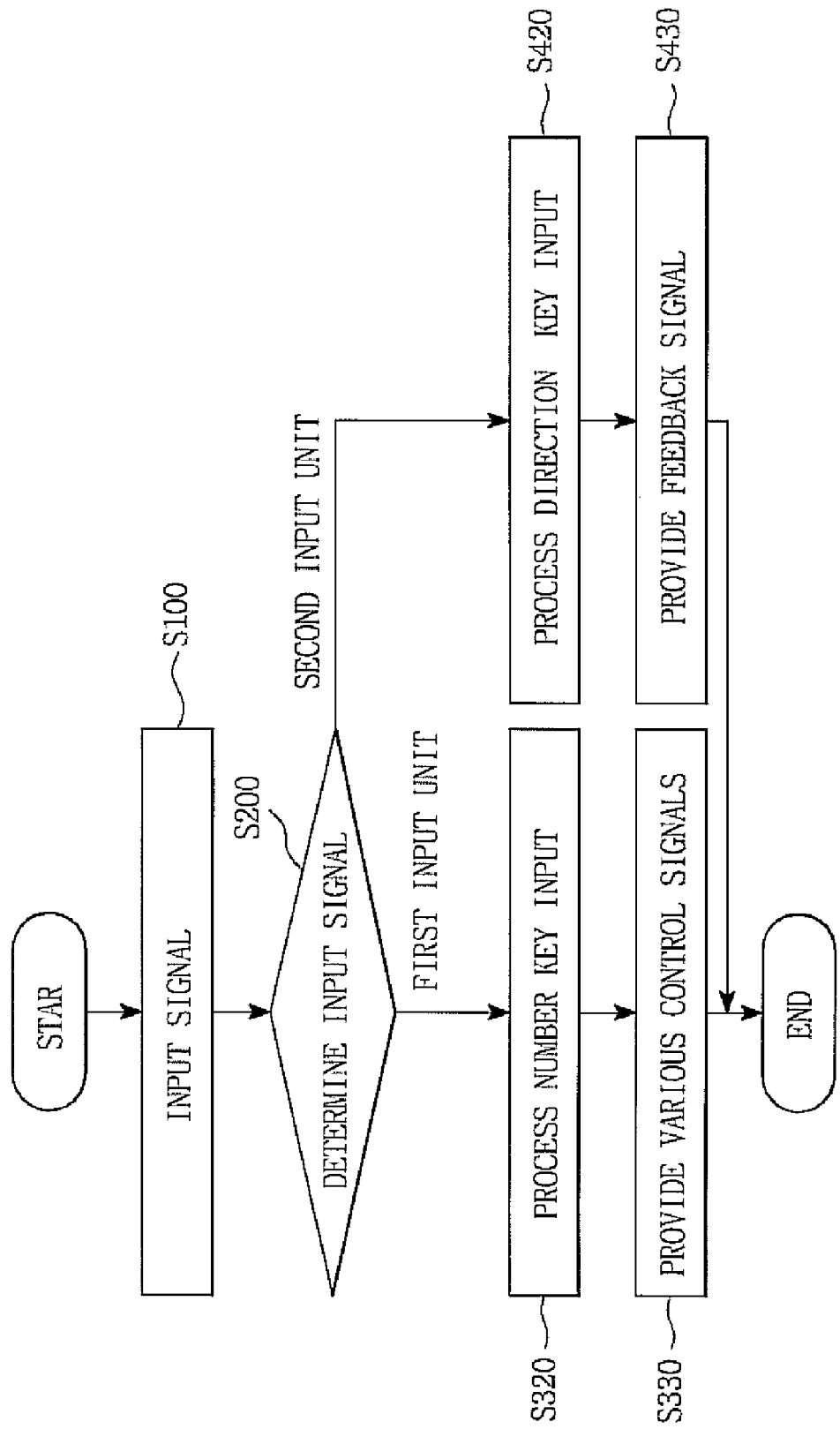
FIG. 3 is a flowchart for processing a key input by the mobile terminal according to one embodiment of the present invention.

FIG. 3 is a flowchart of processing two signal generated by the keypad of FIG. 2.

Referring to FIG. 3, the controller 130 for the mobile telephone 100 receives one of two signals from the key input device such as the keypad 120 at S100. At this time, the controller 130 determines whether the signal received from the keypad 120 at S100 is a first input signal or a second input signal at S200.

When it is determined that the first input signal is received by the controller 130 at S310, the first input, for example the number keys input, is performed at S320. When previous functions assigned to the number keys are stored in the memory 160, various control signals corresponding to the assigned functions are provided to one or more of the RF module 110, the voice processor 140, the display 150 and the memory 160 at S330.

On the other hand, when it is determined that the second input signal is received by the controller at S410, the second input, for example the navigation key input, is performed at S420 and the controller provides a feedback signal corresponding to the navigation key at S430. At this time, the feedback signal may be one or more of a flickering signal through an LED, a vibration signal through a vibration motor 170, or a voice signal through a voice processor 140.

Figure 4A:
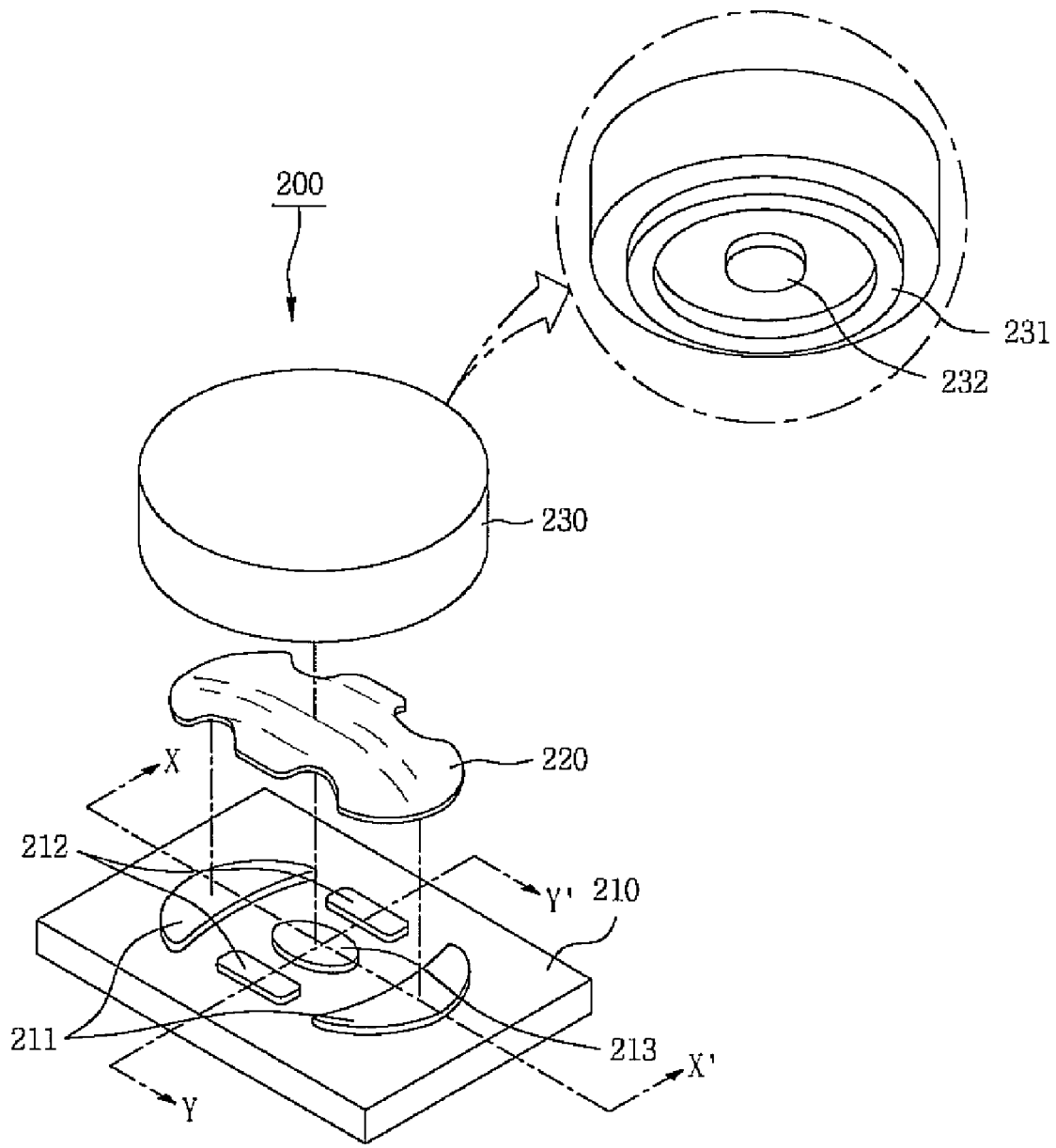
FIG. 4A is an exploded perspective view of a key switch of a keypad according to one embodiment of the present invention.
Figure 4B:
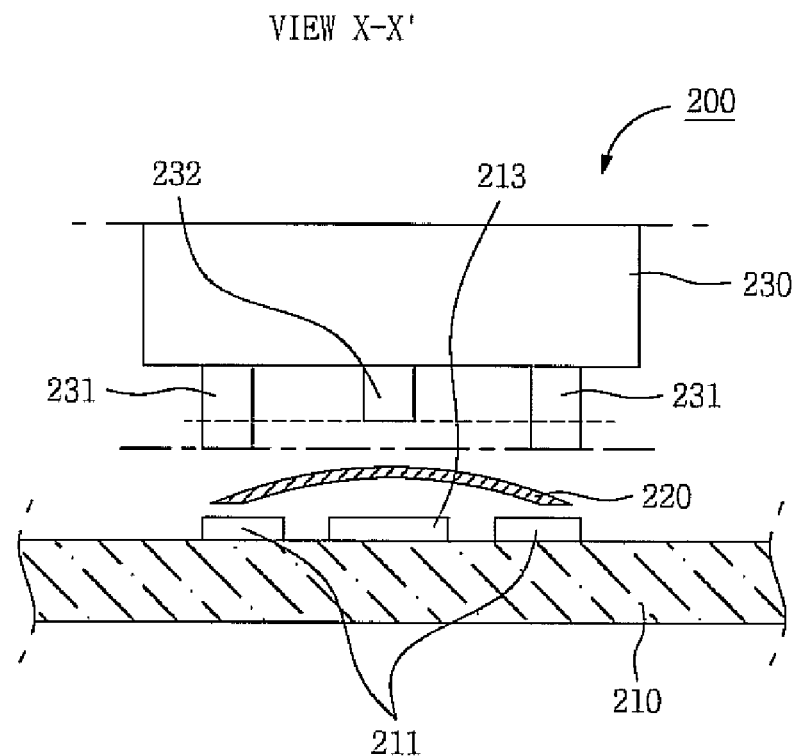
FIG. 4B is a side sectional view of the key switch of FIG. 4A.
Figure 5A:
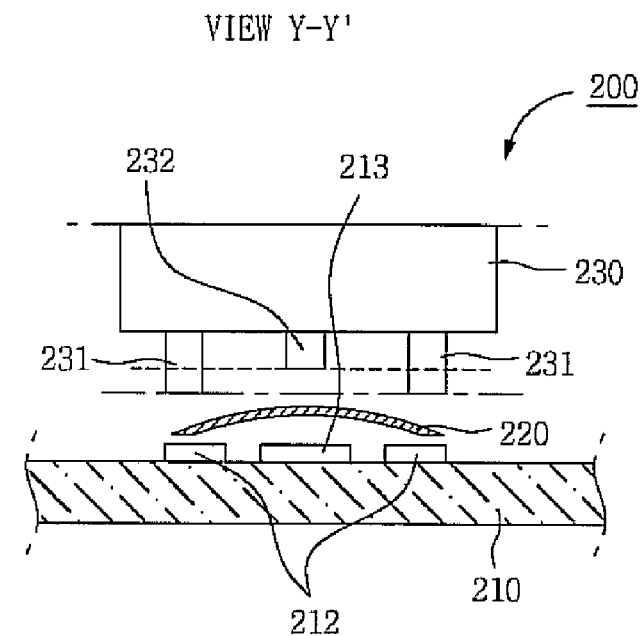
FIGS. 5A to 5B are side sectional views of a key switch according to one embodiment of the present invention.
Figure 5B:
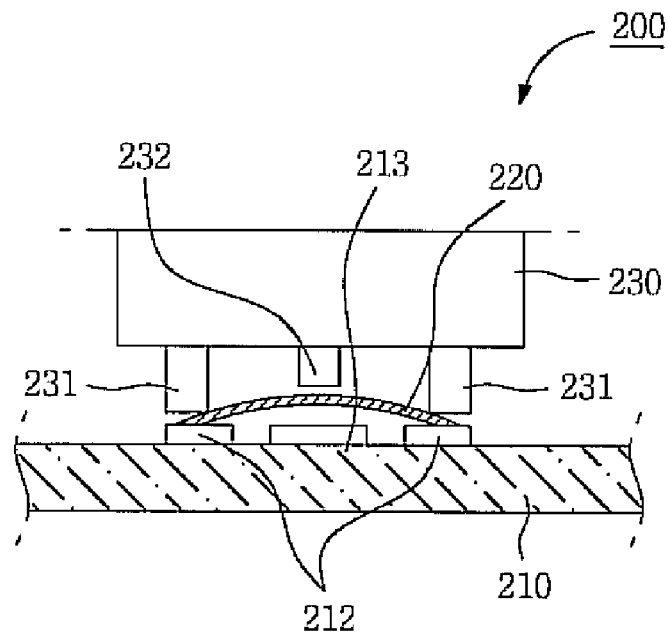

FIG. 4A is an exploded perspective view of a key switch of a keypad according to one embodiment of the present invention, and FIG. 4B is a side sectional view of the key switch of FIG. 4A. FIGS. 5A to 5B are side sectional views of a key switch according to one first embodiment of the present invention. Description will be made with reference to FIGS. 4A, 4B, and 5A to 5B.

As illustrated in FIGS. 4A, 4B, and 5A, the key input device 120, for example, the keypad, comprises a plurality of key switches. Each of the key switches 200 comprises protrusions 212 and 213, a metal plate 220, and a key button 230. The protrusions 212 and 213 are formed on a substrate 210. The elliptical second protrusion 213 is provided in substantially the center of the substrate 210. A pair of first protrusions 212 and a pair of supporting jaws 211 are formed around the second protrusion 213. The pair of first protrusions 212 has the same height. The pair of supporting jaws 211 supports the conductive metal plate 220 and the conductive metal plate 220 may be entirely dome shaped.

Both ends of the metal plate 220 are supported by the pair of supporting jaws 211 not to touch but to correspond to the pair of first protrusions 212.

A key button 230 is formed over the metal plate 220. The button 230 comprises a first pressing jaw 231 and a second pressing jaw 232. The first pressing jaw 231 is circumferentially shaped and provided on the lower surface of the button 230. The second pressing jaw 232 is formed inside the first pressing jaw 231 and does not protrude as far as the first pressing jaw 231.

When a predetermined pressure, for example, 0.05 to 0.10 N/m$^2$, is applied to the button 230, as illustrated in FIG. 5B, the metal plate 220 is deformed by the first pressing jaw 231 so that the both ends of the metal plate 220 contact the first pair of protrusions 212 and that a first contact point is formed to provide the first signal. As a result, both ends of the metal plate 220 and the first pair of protrusions 212 provide contact to the first input unit 121 as shown in FIG. 1.

When additional pressure, greater than the predetermined pressure, for example, 0.17 to 0.25 N/m$^2$, is applied to the button 230, as illustrated in FIG. 5B, the center of the metal plate 220 is deformed by the second pressing jaw 232 so that the center of the metal plate 220 contacts the second protrusion 213 and a second contact point is formed to provide the second signal. As a result, the center of the metal plate 220 and the second protrusion 213 provide contact to the second input unit 122 as shown in FIG. 1. The metal plate 220 may comprise an insulator which electrically insulates and spatially separates both ends and the center. The insulator may make the first and the second contacts electrically independent from each other.

In the key switch 200 according to the embodiment of the present invention is applied to a mobile telephone 100, the number and shape of protrusions 212 and 213, the shape of the metal plate 220, and the heights of the pressing jaws 231 and 232 of the button 200 are not limited, but may vary in accordance with a structure for providing a multi-stage signal and a structure for providing two or more signals. The thickness of the keypad 120 or key input device 200 according to the embodiment of the present invention is the same as the thickness of the conventional keypad or key input device.

For example, the pressure on button 230 for the second input may be higher than the pressure for the first input. In this case, the metal plate 220 may be concave shaped. The heights of the first pressing jaw 231 and the second pressing jaw 232 may be equal to each other, as shown in FIGS. 6A to 6C.

Figure 6A:
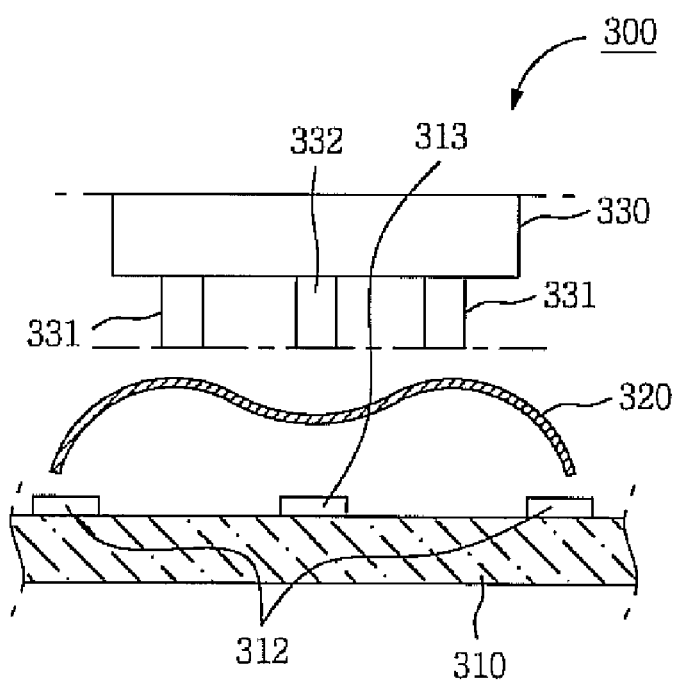
FIGS. 6A to 6C are side sectional views of a key switch according to another embodiment of the present invention.
Figure 6B:
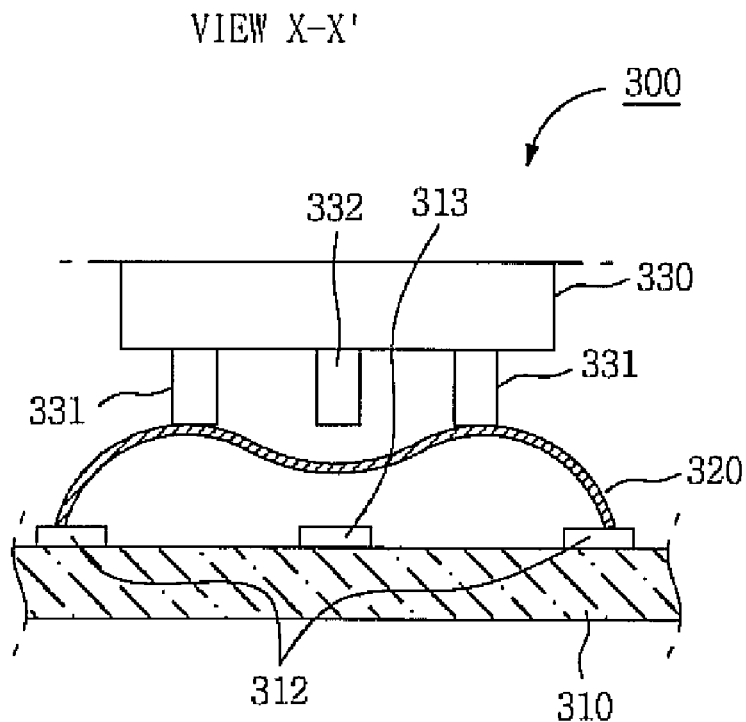
Figure 6C:
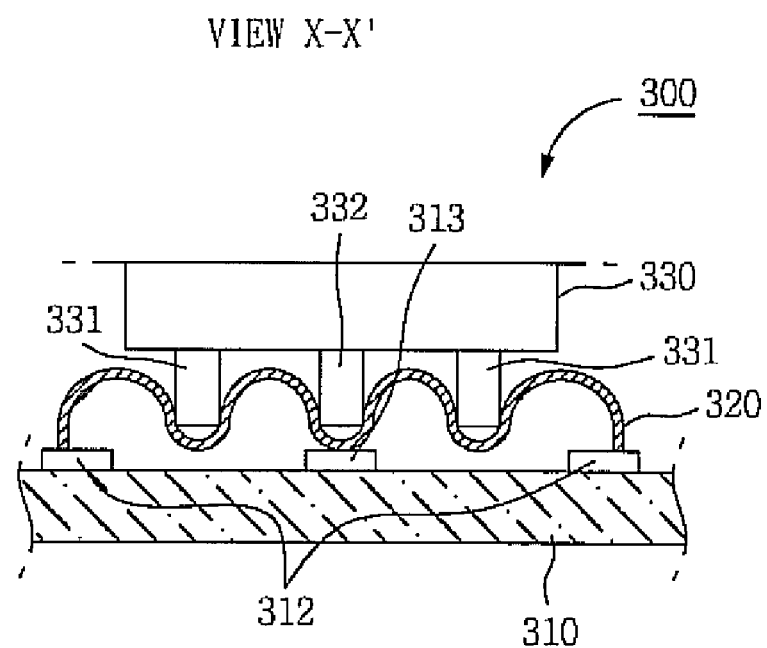

FIGS. 6A to 6C are side sectional views of a key switch according to another embodiment of the present invention.

Referring to FIG. 6A, each of the key switches 300 for a key input device 120 comprises protrusions 312 and 313 having predetermined size on a substrate 310.

The second protrusion 313 is provided in the center of the substrate 310. The pair of first protrusions 312 having the same height as the second protrusion 313 and a pair of supporting jaws (refer to FIG. 4A) by which a conductive metal plate 320 is supported are formed around the second protrusion 313. The metal plate 320 may be concavo-convex shaped.

The both ends of the metal plate 320 are supported, spaced apart from the pair of supporting jaws (refer to FIG. 4A), not in contact with but corresponding to the pair of first protrusions 312.

A key button 330 is formed over the metal plate 320. The button 330 comprises a first pressing jaw 331 formed circumferentially and provided on the lower surface of the button 330. The second pressing jaw 332 is formed inside the first pressing jaw 331 wherein the second pressing jaw 332 has the same height as the first pressing jaw 331.

When a first pressure is applied to the button 330, as illustrated in FIG. 6B, the metal plate 320 is deformed by the first pressing jaw 331 so that the both ends of the metal plate 320 contact the first pair of protrusions 312 and that a first contact point is formed to provide a first signal.

When a second pressure, higher than the first pressure, is applied, as illustrated in FIG. 6C, the center of the metal plate 320 is deformed by the second pressing jaw 332 so that the center of the metal plate 220 contacts the second protrusion 213 and that a second contact point is formed to provide the second signal.

Figure 7A:
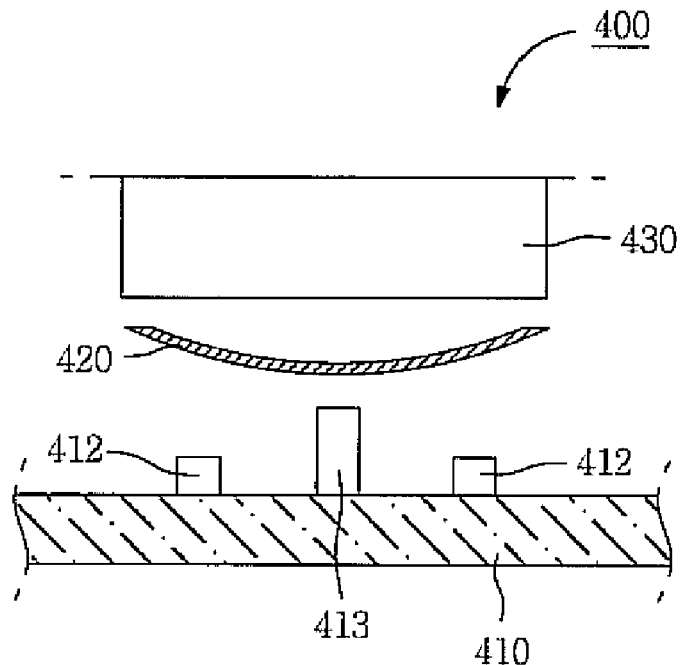
FIGS. 7A to 7C are side sectional views of a key switch according to yet another embodiment of the present invention.
Figure 7B:
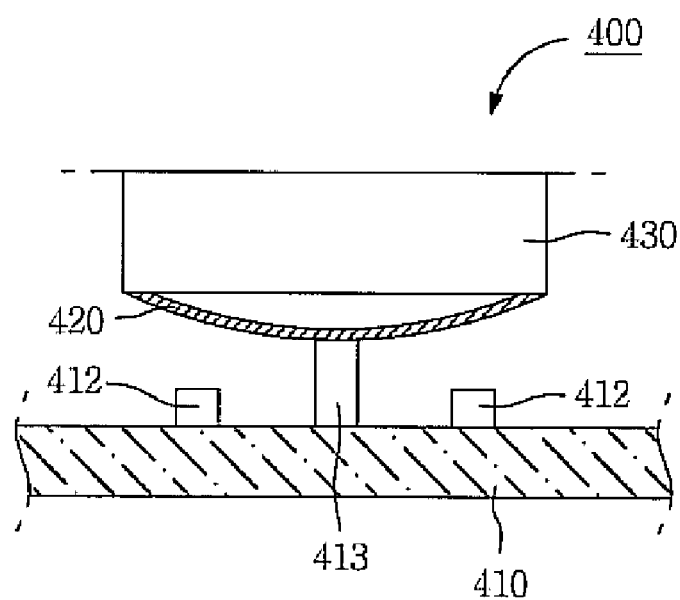
Figure 7C:
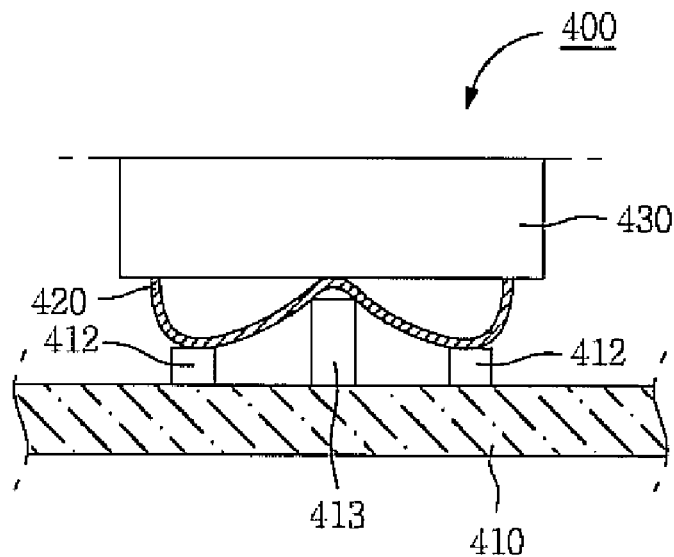

FIGS. 7A to 7C are side sectional views of a key switch according to still another embodiment of the present invention.

Referring to FIG. 7A, the key switch 400 comprises protrusions 412 and 413 on a substrate 410. The second protrusion 413 is provided in the center of the substrate 410 and a pair of first protrusions 412 are formed around the second protrusion 413. The second protrusion 413 is taller than the pair of first protrusions 412. In alternate embodiments, the pair of first protrusions 412 may be taller or the same height as the second protrusions 413.

The metal plate 420 is formed of a conductive material and may be concave shaped.

A button 430 has a predetermined shape such that the both ends of the metal plate 420 are fixed to but spaced apart from the lower surface of the button 430.

When a pressure is applied to the button 430 having the above-described structure, as illustrated in FIG. 7B, the metal plate 420 contacts the second protrusion 413 so that a first contact point is formed to provide a first signal. When a greater pressure is applied to the button 430, as illustrated in FIG. 7C, the metal plate 420 contacts the first protrusions 412 so that a second contact point is formed to provide a second signal.

Figure 8A:
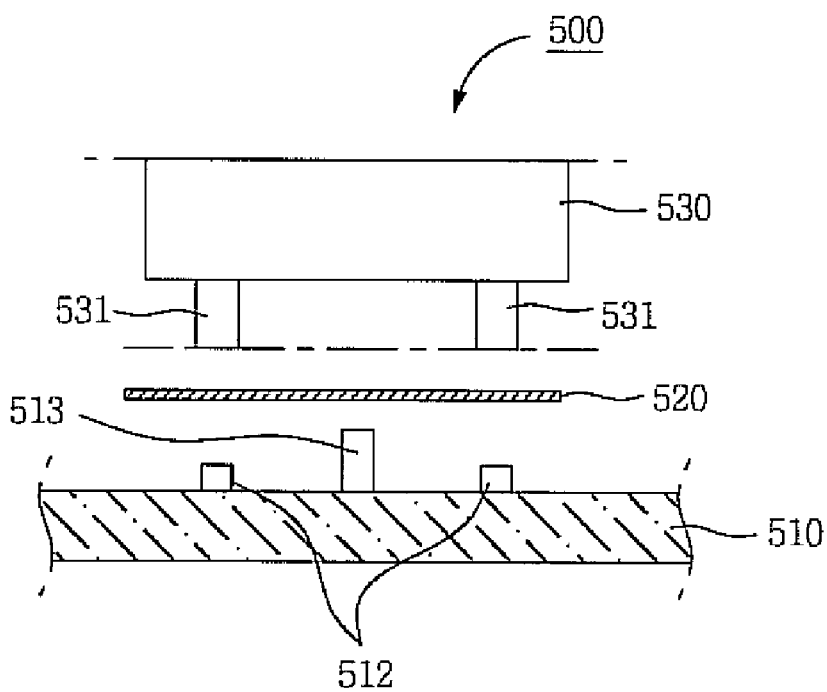
FIGS. 8A to 8C are side sectional views of a key switch according to still another embodiment of the present invention.
Figure 8B:
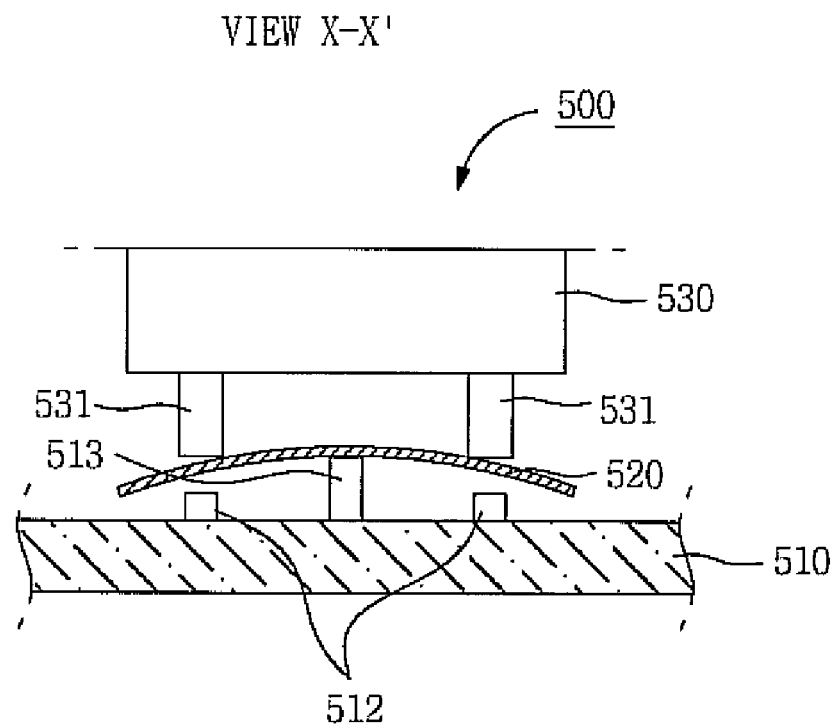
Figure 8C:
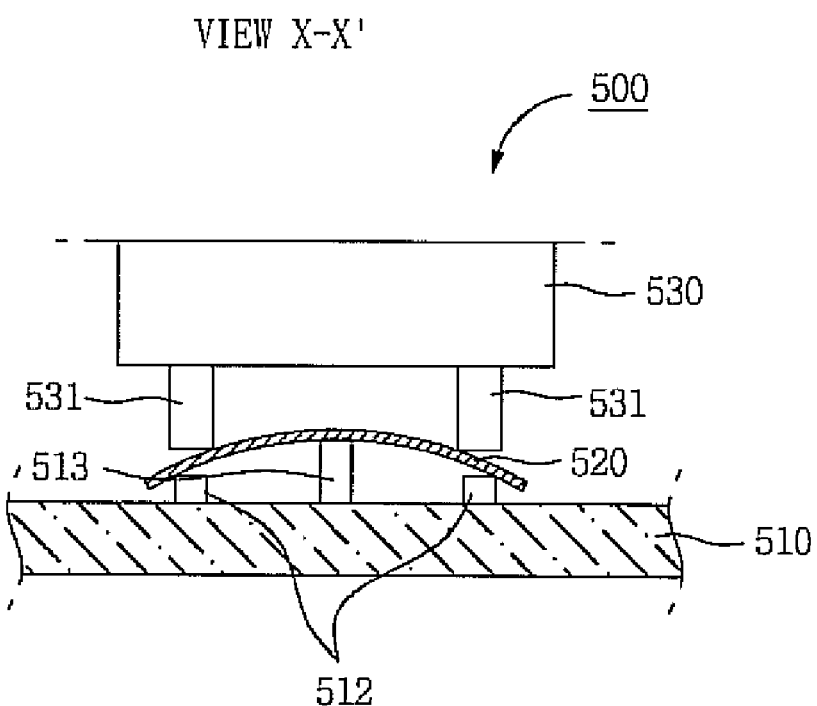

FIGS. 8A to 8C are side sectional views of a key switch according to still another embodiment of the present invention.

Referring to FIG. 8A, the key switch 500 comprises protrusions 512 and 513 on a substrate 510. The second protrusion 513 is provided in the center of the substrate 510 and a pair of first protrusions 512, shorter than the second protrusion 513, is provided adjacent to the first protrusion 512. A pair of supporting jaws (not shown) by which a conductive metal plate 520 is supported are formed around the second protrusion 513.

The both ends of the metal plate 520 are supported by the pair of supporting jaws that correspond to the pair of first protrusions 512.

A button 530 is formed over the metal plate 520. The button 530 comprises just one pressing jaw 531 circumferentially arranged on the lower surface of the button 530.

When a pressure is applied to the button 530 of the key switch 500, as illustrated in FIG. 8B, the metal plate 520 is deformed by the pressing jaw 531 so that the central lower surface of the metal plate 220 contacts the second protrusion 513 forming a first contact point to provide a first signal.

When a greater pressure is applied, as illustrated in FIG. 8C, the external lower surface of the metal plate 520 contacts the first protrusions 512 forming a second contact point to provide a second signal.

Figure 9A:
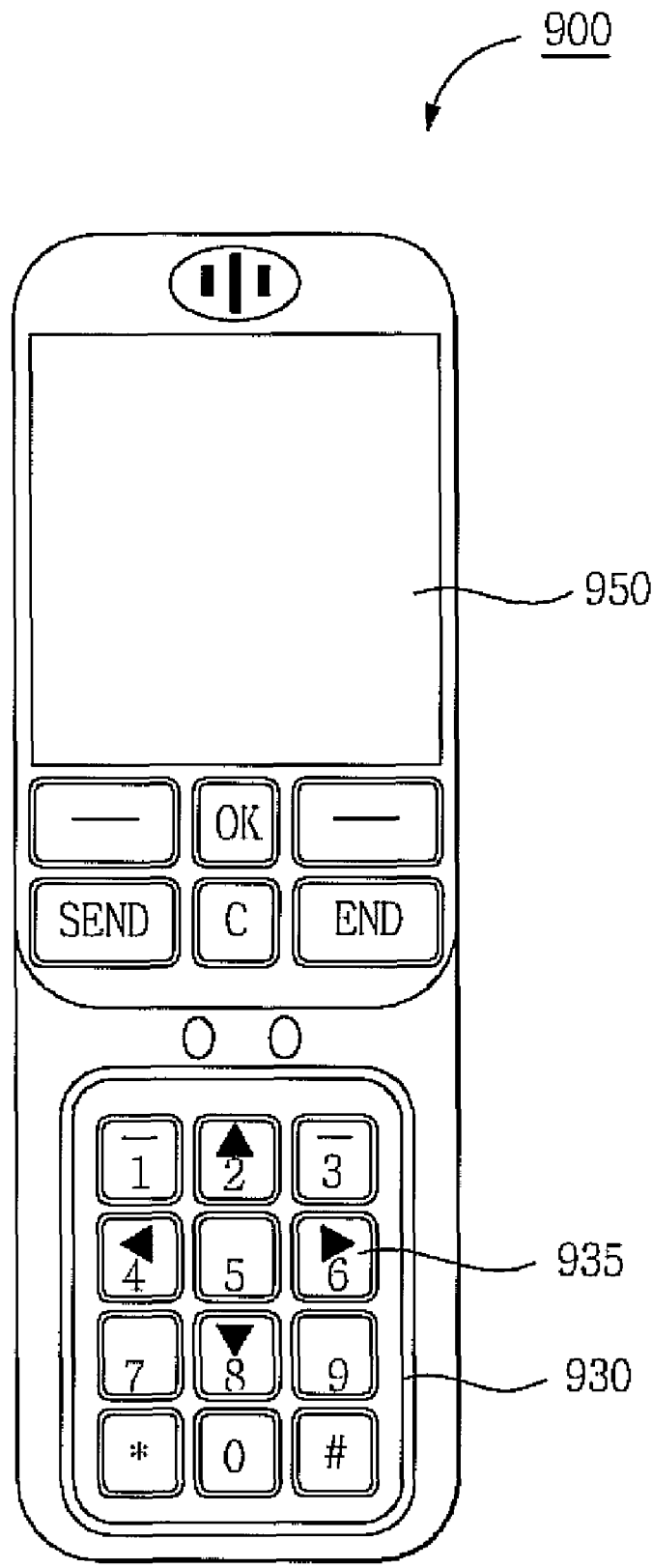
FIGS. 9A to 9C are front views of the external appearance of the mobile terminal according to the present invention, in which examples of the functions of the mobile terminal keypad according to the present invention are illustrated.
Figure 9B:
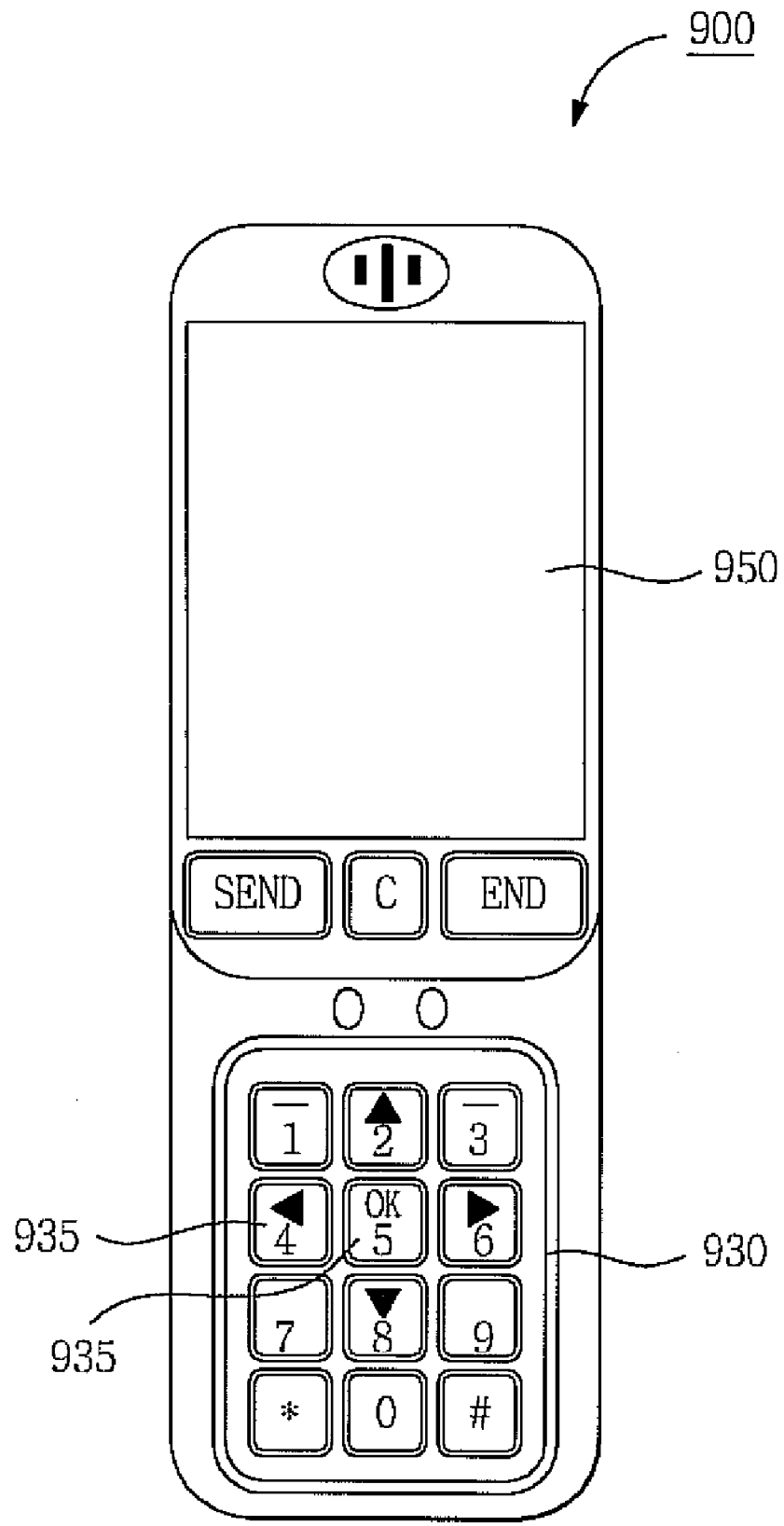
Figure 9C:
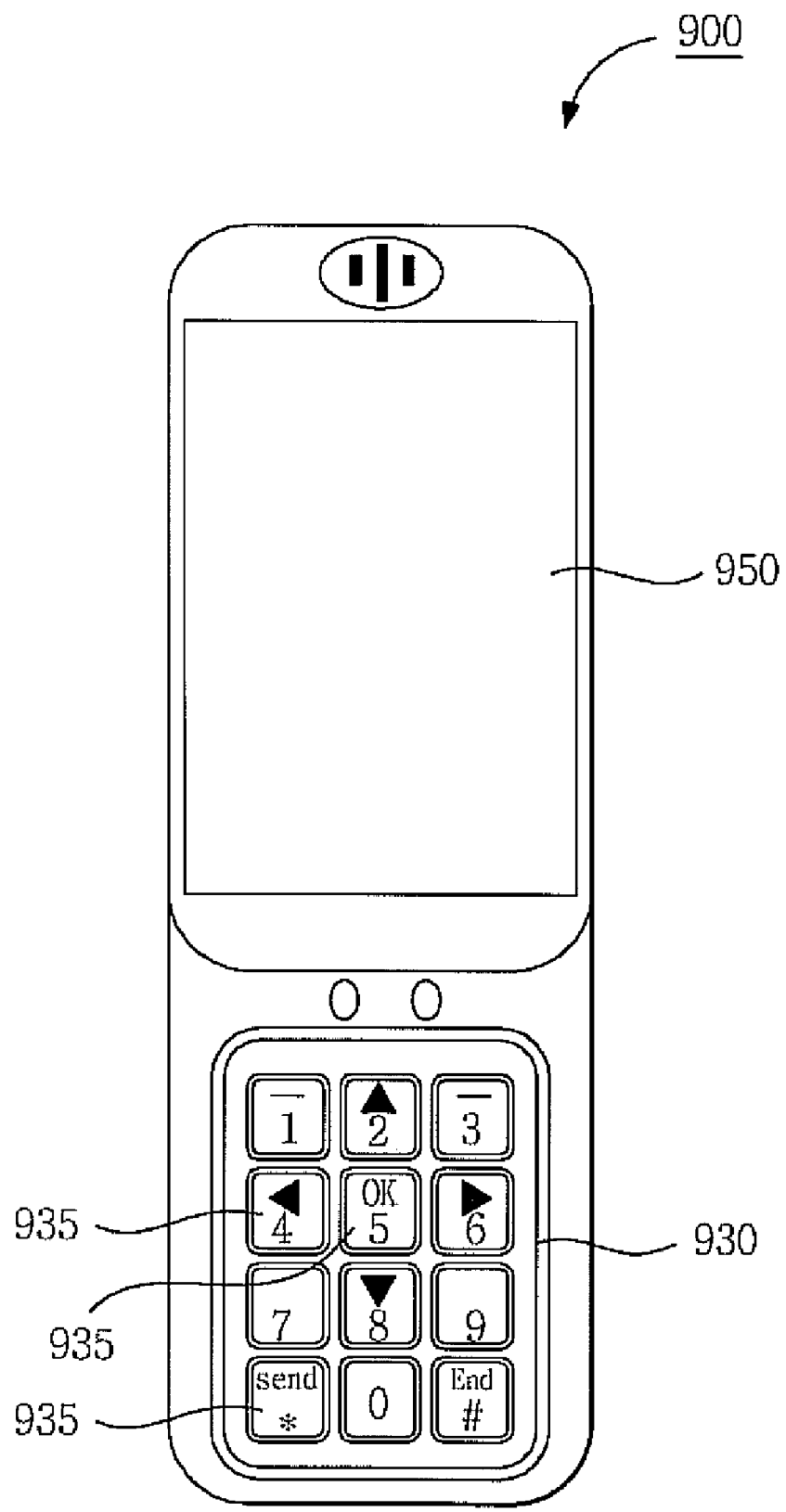

FIGS. 9A to 9C are front views of the external appearance of the mobile terminal according to the embodiment of the present invention, in which examples of setting the functions of the keypad of the mobile terminal according to the embodiments of the present invention are illustrated.

FIG. 9A is a first front view of the external appearance of the mobile telephone according to one embodiment of the present invention.

Referring to FIG. 9A, a slide type mobile telephone 900 is used as an example. The mobile telephone 900 comprises the keypad 930 and the display 950. The keypad 930 of the mobile terminal 900 comprises key switches 935 arranged in a 3 by 4 array. The plurality of key switches 935 are the numbers 0 to 9, "*", and "#" keys.

Some of the key switches 935, for example 2, 4, 6 and 8 keys, are the key switches as described above in reference to FIGS. 4A to 8C. When a pressure is applied to these key switches, signals representing the numbers are provided. When greater pressure is applied to the keys, signals representing the navigation keys corresponding to the number keys are provided.

FIG. 9B is a second front view of the external appearance of the mobile terminal according to the embodiments of the present invention.

Referring to FIG. 9B, the mobile telephone 900 comprises the keypad 930 and the display 950. The keypad 930 comprises a plurality of key switches 935. Some of the key switches 935, for example, the 2, 4, 6 and 8 keys, are the key switches as described above in reference to FIG. 9A.

Others of the key switches 935, for example keys 1, 3 and 5, are also the key switches as described above in reference to FIGS. 4A to 8C. These key switches 935 function as the hot keys such as "-" and "OK" key as well as the number keys. Therefore, separate hot keys are not provided in the mobile telephone to simplify the external appearance.

FIG. 9C is the third front view of the external appearance of the mobile terminal according to the embodiment of the present invention.

Referring to FIG. 9C, some of the key switches, for example, keys 1 to 6 and 8, perform the same functions as the key switches as described above in reference to FIGS. 9A and 9B.

Other key switches, for example, "*", 0, and "#" function as "Send", "C(clear)" and "End" keys respectively as well. Therefore, separate function keys are not provided in the mobile telephone simplifying the external appearance.

Furthermore, the keypad of the mobile terminal as shown in FIGS. 9A to 9C is 3×4 keypad, but may be a 3×3, 4×3, or 4×4 keypad.

Figure 10:
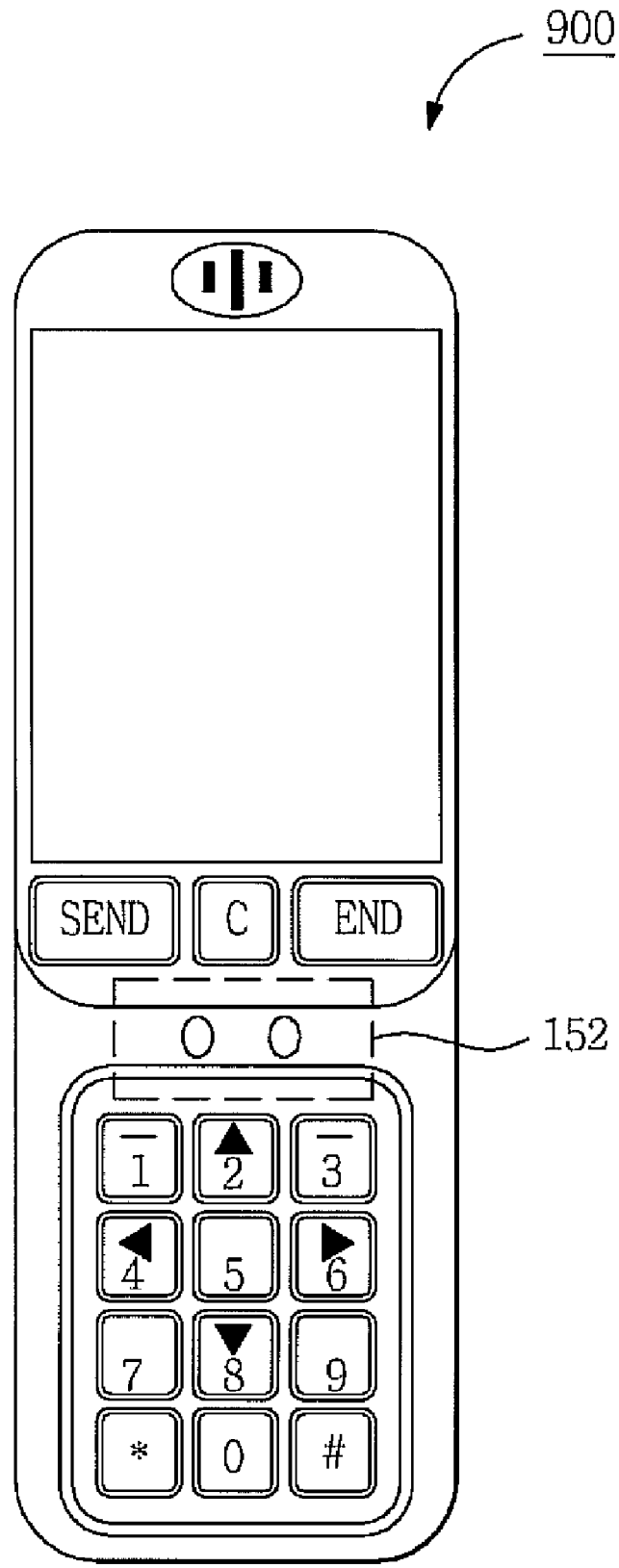
FIG. 10 is a front view of the external appearance of a mobile terminal from which a feedback signal is provided according to an embodiment of the present invention.

FIG. 10 is a front view of the external appearance of a mobile terminal having a feedback signal according to an embodiment of the present invention.

Referring to FIG. 10, two LEDs 152 are located on the main body of the mobile telephone and disposed between the display and the keypad, as illustrated in FIG. 10. One of The LEDs 152, for example, the left LED in FIG. 10, emits light when the first signal is generated from one of the key switches for the keypad. The right LED emits light when the second signal is generated from one of the key switches for the keypad.

Furthermore, according to the present invention, the slide type mobile in FIG. 10 telephone is used as an example. However, the LEDs 152 may be provided in bar type, folder type, and flip type mobile telephones in certain positions.

According to the above-described embodiments of the present invention, the key input device is a keypad. But the present invention is not limited thereto. The key input device may be a navigation key(s), a side key(s) and various function keys, etc.

The invention being thus described above, it will be obvious that the same may be varied in many ways. Such variations are not to be regarded as a departure from the spirit and scope of the invention, and all such modifications as would be obvious to one skilled in the art are intended to be comprised within the scope of the following claims.

As described above, according to the present invention, it is possible to provide a keypad structure for outputting a multi-stage signal without increasing the thickness of the keypad.

According to the present invention, it is also possible to provide a multi-stage signal using a difference in pressures applied to the key switches and to minimize the operation of the key switches.

According to the present invention, it is also possible to increase the size of the LCD screen by minimizing the key switches of the keypad.

What is claimed is:

1. A mobile terminal comprising:
   a key input device comprising a plurality of key switches, each of the plurality of key switches comprising at least two contact points, a plate formed over the at least two contact points, and a key button formed over the plate, wherein pressing the key button urges the plate to sequentially contact each of the at least two contact points according to pressure applied to the key button; and
   a controller providing control signals in accordance with the sequential contact of the plate with the at least two contact points,
   wherein the controller feeds back at least one of the control signals to provide a feedback signal for checking user input.

2. The mobile terminal of claim 1, wherein:
   one of the control signals is a number key signal in accordance with a first contact of the plate with one of the at least two contact points; and
   another of the control signals is a navigation key signal in accordance with a next contact of the plate with another of the at least two contact points.

3. The mobile terminal of claim 1, wherein:
   one of the control signals is a number key signal in accordance with a first contact of the plate with one of the at least two contact points; and
   another of the control signals is a hot key signal in accordance with a next contact of the plate with another of the at least two contact points.

4. The mobile terminal of claim 3, wherein the hot key signal is one of "send", "start" and "end".

5. The mobile terminal of claim 1, further comprising a display for displaying the result of processing the control signals.

6. The mobile terminal of claim 1, wherein the plate is concave, convex, or concavo-convex.

7. The mobile terminal of claim 6, wherein each of the at least two contact points is formed on a protrusion in accordance with the shape of the plate.

8. A mobile terminal, comprising:
   a key input device comprising a plurality of key switches, each of the plurality of key switches comprising at least two contact points, a plate formed over the at least two contact points, and a key button formed over the plate; and
   a controller providing control signals in accordance with the sequential contact of the plate with the at least two contact points,
   wherein pressing the key button urges the plate to sequentially contact each of the at least two contact points according to pressure applied to the key button, and
   wherein the key button comprises a first jaw for urging the plate into contract with a first protrusion when a first pressure is applied to the key button; and a second jaw for urging the plate into contact with a second protrusion when a second pressure greater than the first pressure is applied to the key button.

9. The mobile terminal of claim 1,
   wherein the plate is dome-shaped having an outer circumference and a central point, and wherein the dome-shaped plate is curved to the key button,
   wherein the at least two contact points comprise a first contact point that contacts the outer circumference of the dome shaped plate and a second contact point that contacts a central point of the dome shaped plate, and
   wherein a first and second jaw are formed on the surface of the key button,
   wherein the first jaw urges the outer circumference of the dome shaped plate to the first contact point in accordance with the applied pressure,
   wherein the second jaw urges the central point of the dome shaped plate to the second contact point in accordance with an applied pressure greater than that required to urge the circumference of the dome shaped plate to the first contact point.

10. The mobile terminal of claim 9,
    wherein, with increasing pressure applied to the key button, the central point of the dome shaped plate contacts a first protrusion formed in a substrate to establish a first contact, and subsequently the outer circumference of the dome shaped plate contacts a second protrusion formed on the substrate thereby establishing a second contact.

11. A mobile terminal, comprising:
    a key input device comprising a plurality of key switches, each of the plurality of key switches comprising at least two contact points, a plate formed over the at least two contact points, and a key button formed over the plate; and
    a controller providing control signals in accordance with the sequential contact of the plate with the at least two contact points,
    wherein pressing the key button urges the plate to sequentially contact each of the at least two contact points according to pressure applied to the key button,
    wherein concavo-convex regions having different distances to the at least two contact points are formed on the plate, and
    wherein jaws formed on a lower surface of the key button correspond to the at least two contact points for urging the plate to sequentially contact each of the at least two contact points.

12. A key input device comprising a plurality of key switches, the key input device comprising:
    at least two contact points formed in a substrate;
    a plate formed over the at least two contact points; and
    a key button formed over the plate for urging the plate into sequential contact with the at least two contact points according to pressure applied to the key button,
    wherein each of the at least two contact points is formed on a protrusion having a height in accordance with the shape of the plate.

13. The key input device of claim 12, wherein the plate has concave, convex, or concavo-convex regions corresponding to different distances between the key button and the at least two contact points.

14. The key input device of claim 12, wherein each of the at least two contact points comprise:
   a first contact point for contacting a region of the plate responsive to a first pressure applied to the key button to provide a first signal; and
   a second contact point for contacting another region of the plate responsive to a second pressure greater than the first pressure applied to the key button to provide a second signal.

15. The key input device of claim 14, wherein the key button comprises:
   a first jaw for urging the plate a predetermined distance to the first contact point responsive to the first pressure applied to the key button; and
   a second jaw for urging the plate a further distance to the second contact point responsive to the second pressure applied to the key button.

16. The key input device of claim 12,
   wherein the plate is dome-shaped having an outer circumference and a central point, and wherein the dome-shaped plate is curved to the key button,
   wherein the at least two contact points comprise a first contact point that contacts the outer circumference of the dome shaped plate and a second contact point that contacts the central point of the dome shaped plate, and
   wherein a first and second jaw are formed on the surface of the key button,
   wherein the first jaw urges the outer circumference of the dome shaped plate to the first contact point in accordance with the applied pressure,
   wherein the second jaw urges the central point of the dome shaped plate to the second contact point in accordance with an applied pressure greater than that required to urge the circumference of the dome shaped plate to the first contact point.

17. The key input device of claim 12,
   wherein the plate is dome shaped having an outer circumference and a central point, and wherein the dome-shaped plate is to be curved to the substrate, and
   wherein, with increasing pressure applied to the key button, the central point of the dome shaped plate contacts a first protrusion formed in the substrate to establish a first contact, and subsequently the circumference of the dome shaped plate contacts a second protrusion formed on the substrate thereby establishing a second contact.

18. A key input device comprising a plurality of key switches, the key input device comprising:
   at least two contact points formed in a substrate;
   a plate formed over the at least two contact points; and
   a key button formed over the plate for urging the plate into sequential contact with the at least two contact points according to pressure applied to the key button,
   wherein jaws formed on a lower surface of the key button correspond to the at least two contact points for urging the plate into sequential contact with the at least two contact points.

19. A method for processing an input from a key input device of a mobile terminal, the method comprising:
   receiving a key switch signal from a key input device comprising a plurality of key switches, each of the plurality of key switches comprising at least two contact points, and a plate formed over the at least two contact points such that the plate sequentially contacts each of the at least two contact points according to pressure applied to the key input device in order to sequentially generate at least two signals;
   determining whether the key switch signal is a first signal or a second signal in accordance with the pressure applied to the key input device;
   processing a function according to whether the key switch signal is the first or the second signal; and
   feeding back at least one of the first signal and the second signal to display the input.

20. The method of claim 19,
   wherein receiving the key switch signal comprises receiving a first signal from a first contact point according to a first pressure, and a second signal from a second contact point according to a second pressure, wherein the second pressure is greater than the first pressure, and
   wherein processing a function comprises processing a first function when the first signal is provided and processing a second function with the second signal is provided.

21. The method of claims 20, wherein the first function is processing a number key corresponding to key input device, and wherein the second function is processing a navigation function corresponding to key input device.

* * * * *